(12) United States Patent
Kato et al.

(10) Patent No.: US 6,240,782 B1
(45) Date of Patent: Jun. 5, 2001

(54) SEMICONDUCTOR PHYSICAL QUANTITY SENSOR AND PRODUCTION METHOD THEREOF

(75) Inventors: Nobuyuki Kato, Seto; Toshimasa Yamamoto, Ama-gun; Tsuyoshi Fukada, Aichi-gun; Minekazu Sakai, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/247,865

(22) Filed: Feb. 11, 1999

(30) Foreign Application Priority Data

Feb. 12, 1998 (JP) .................................. 10-030045
Dec. 24, 1998 (JP) .................................. 10-367421

(51) Int. Cl.$^7$ ................................................ G01P 15/125
(52) U.S. Cl. .................................. 73/514.32; 73/514.18; 361/280
(58) Field of Search ........................... 73/514.18, 514.32, 73/514.24, 514.38, 514.16, 514.21, 514.36; 257/415; 361/280, 283.1, 283.2, 283.3

(56) References Cited

U.S. PATENT DOCUMENTS

| | | | |
|---|---|---|---|
| 5,495,761 | 3/1996 | Diem et al. | 73/514.32 |
| 5,561,248 | 10/1996 | Negoro | 73/514.32 |
| 5,563,343 | 10/1996 | Shaw et al. | 73/514.18 |
| 5,569,852 | * 10/1996 | Marek et al. | 73/514.32 |
| 5,610,335 | 3/1997 | Shaw et al. | 73/514.36 |
| 5,616,523 | 4/1997 | Benz et al. | 438/50 |
| 5,627,317 | * 5/1997 | Offenberg et al. | 73/514.32 |
| 5,723,353 | 3/1998 | Muenzel et al. | 437/51 |
| 5,756,901 | * 5/1998 | Kurle et al. | 73/514.32 |
| 5,987,989 | * 11/1999 | Yamamoto et al. | 73/514.32 |

FOREIGN PATENT DOCUMENTS

| | | |
|---|---|---|
| 4-162779 | 6/1992 | (JP) . |
| 6-88838 | 3/1994 | (JP) . |
| 6-331648 | 12/1994 | (JP) . |
| 9-211022 | 8/1997 | (JP) . |

\* cited by examiner

*Primary Examiner*—Helen Kwok
(74) *Attorney, Agent, or Firm*—Pillsbury Winthrop LLP

(57) ABSTRACT

A semiconductor physical quantity sensor includes a substrate, a beam-structure movable portion and a fixed portion. The beam-structure movable portion is suspended by four anchors formed of polycrystalline films. A rectangular mass is suspended between beams. Movable electrodes project from both sides of the mass. First fixed electrodes and second fixed electrodes are fixedly provided on the surface of the substrate. The substrate has a laminated structure, wherein an oxide film, attaching film, insulating films, conductive film and insulating film are laminated on the substrate. An anchor formed from the conductive film is electrically connected to the attaching film. An electrode pad made of an aluminum film is provided the above the anchor. Because this structure enables the potential of the attaching film to be fixed, parasitic capacitance can be decreased.

16 Claims, 17 Drawing Sheets

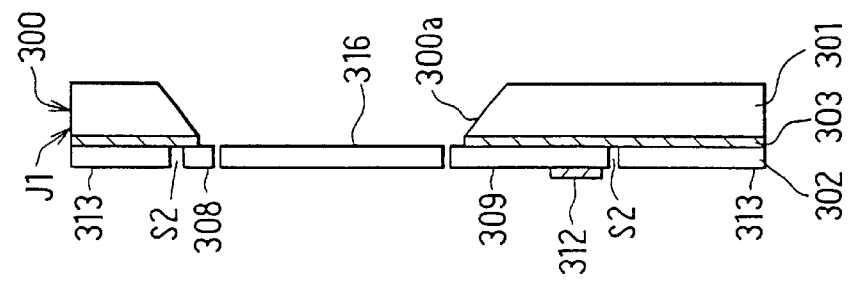
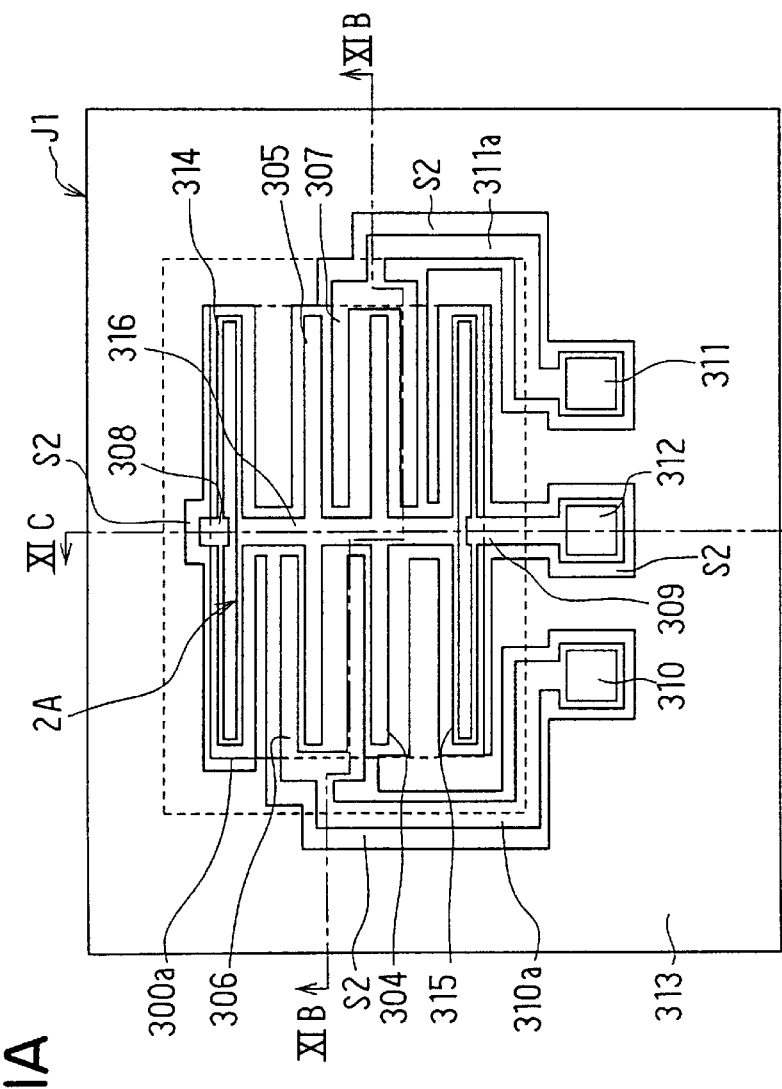
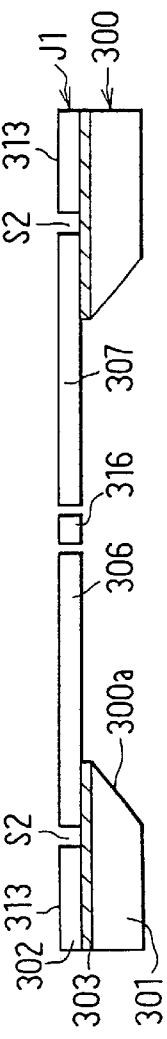

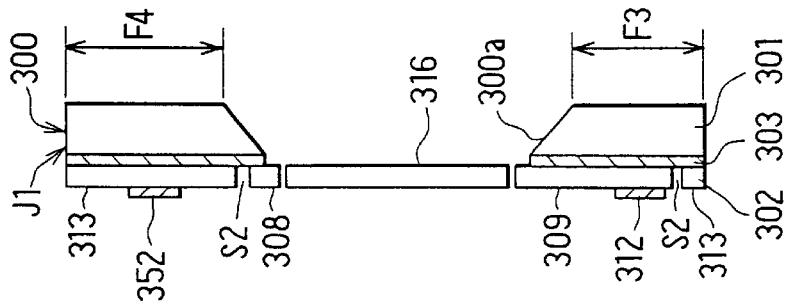
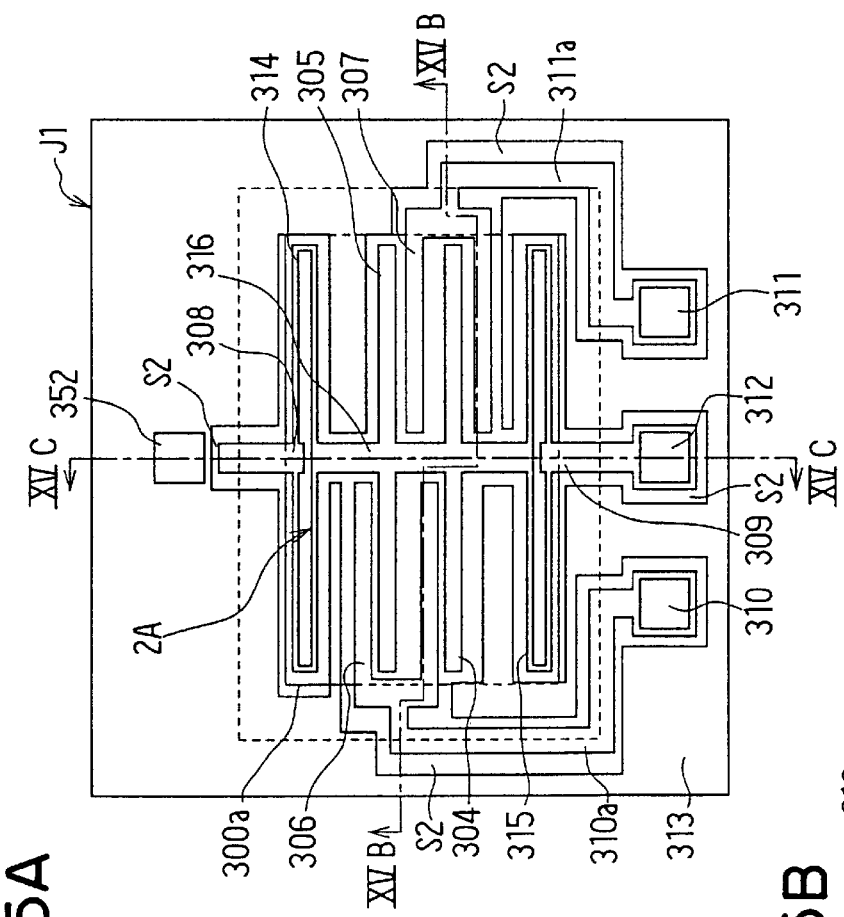
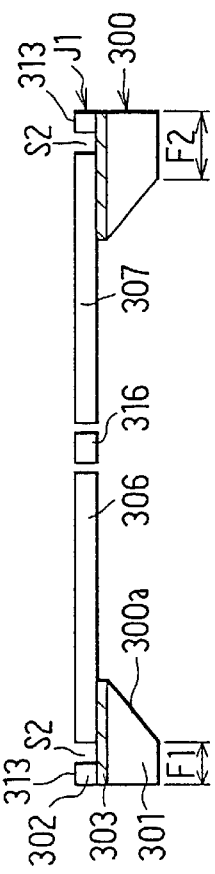

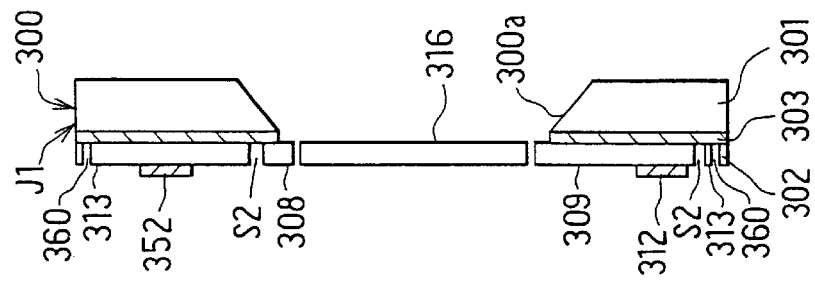
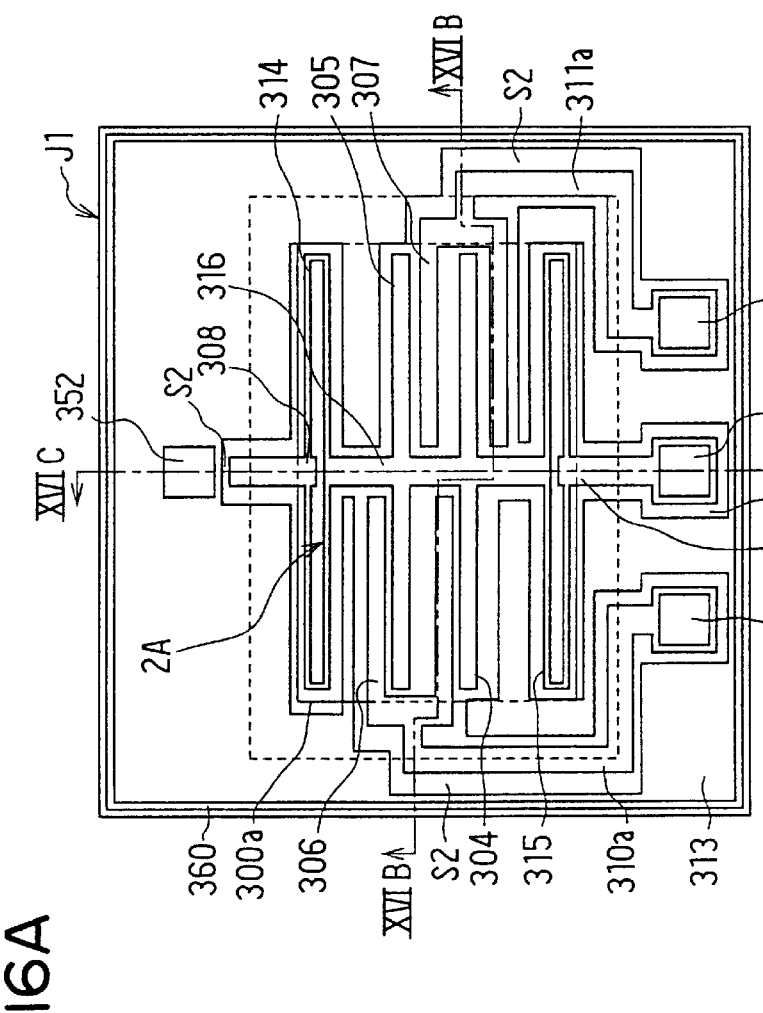
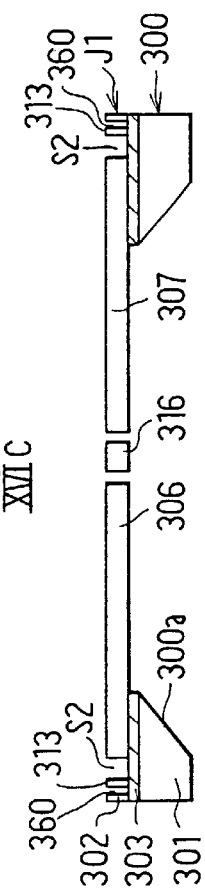

SEMICONDUCTOR PHYSICAL QUANTITY SENSOR AND PRODUCTION METHOD THEREOF

CROSS REFERENCE TO RELATED APPLICATION

This application is based upon and claims priority from Japanese Patent Applications No. Hei. 10-30045 filed Feb. 12, 1998 and No. Hei. 10-367421 filed Dec. 24, 1998, the contents of which are incorporated herein by reference.

BACKGROUND OF THE INVENTION

1. Field of the Invention

The present invention relates to a semiconductor physical quantity sensor, having a beam-structure movable portion and a fixed portion, for measuring a physical quantity, such as acceleration, yaw rate or vibration by detecting a capacitance change between the beam-structure movable portion and the fixed portion, and a method of producing such a sensor.

2. Description of Related Art

A conventional semiconductor physical quantity sensor having a beam-structure movable portion is a known differential servo-control capacitance acceleration sensor employing an attached substrate unit (as disclosed in Japanese Patent Application Laid-open No. Hei. 9-211022).

This sensor, formed from a beam-structure movable portion and a fixed portion on a substrate (support substrate), detects a physical quantity by detecting a capacitance change between the beam-structure movable portion and the fixed portion. The beam-structure has a first anchor and a mass portion supported by the anchor via a beam portion. This mass portion has a movable electrode that moves upon application of a force caused by acceleration. The fixed portion has a fixed electrode facing the movable electrode and fixed to the substrate by a second anchor. Further, the substrate has an attaching thin film formed on a semiconductor substrate, an insulating film formed on the attaching thin film and a conductive film formed on the insulating film. The first and second anchor portions are formed from a conductive film.

In this acceleration sensor, sensitivity of the sensor is largely affected by parasitic capacitance formed between the conductive film and the insulating film or the attaching thin film. Specifically, when a capacitance between the beam-structure and fixed portion is measured, sensor output is represented by (capacitance variation)/((total capacitance)+(parasitic capacitance)). Therefore, when the attaching film is electrically floated, the parasitic capacitance is, and the sensitivity of the sensor is small.

In general, the above semiconductor physical quantity sensor is produced by employing a semiconductor producing method such as etching, so that a separation trench separating the movable portion from the fixed portion is formed in an element forming film formed on the support substrate. Therefore, at a surrounding portion of a sensor element portion having the movable portion and the fixed portion, there is an element forming film portion that is another portion of the sensor element portion.

Furthermore, although the surrounding portion is supported by the support substrate, this portion is electrically floated. This structure leads to change the sensor output as in the attaching thin film structure.

SUMMARY OF THE INVENTION

A first object of the present invention is to provide a semiconductor physical quantity sensor which can prevent a decrease in sensitivity caused by the parasitic capacitance of the attaching thin film.

A second object of the present invention is to provide a semiconductor physical quantity sensor which can prevent a decrease in sensitivity caused by the parasitic capacitance formed in the surrounding portion of a sensor element portion.

According to one aspect of the present invention, a semiconductor physical quantity sensor comprises: a sensor element portion, a surrounding portion provided at a surrounding region of the sensor element portion and insulated from the sensor element portions and potential fixing means for fixing a potential of the surrounding portion.

This structure enables the potential of the surrounding portion to be fixed, so that parasitic capacitance can be decreased. Therefore, it can prevent a decrease in sensitivity caused by the parasitic capacitance of the surrounding portion.

According to one aspect of the present invention, a semiconductor physical quantity sensor comprises: a substrate having a first conductive film, an insulating film and a second conductive film, each being laminated on a semiconductor substrate; a beam-structure having a movable electrode, supported on a surface of the substrate by a first anchor, the first anchor being formed from the second conductive film; a fixed electrode faced to the movable electrode, fixed to the surface of the substrate by a second anchor, the second anchor being formed from the second conductive film; and film potential fixing means for fixing a potential of the first conductive film.

This structure enables the potential of the first conductive film to be fixed, so that parasitic capacitance can be decreased. Therefore, it can prevent sensing sensitivity from decreasing caused by the parasitic capacitance of the first conductive film from decreasing.

According to another aspect of the present invention, a semiconductor physical quantity sensor comprises: a substrate having a support substrate and an element forming film formed on the support substrate; a sensor element portion formed on the substrate having a movable portion, the sensor element portion detecting a capacitance change in response to a movement of the movable portion; a surrounding portion provided at a surrounding region of the sensor element portion and divided from the sensor element portion with a trench formed in the element forming film; and region potential fixing means for fixing a potential of the surrounding portion.

This structure enables the potential of the surrounding portion to be fixed, so that parasitic capacitance can be decreased. Therefore, it can prevent sensing sensitivity from decreasing caused by the parasitic capacitance of the surrounding portion.

BRIEF DESCRIPTION OF THE DRAWINGS

The present invention will be understood more fully from the detailed description given hereinafter, taken in conjunction with the accompanying drawings.

In the drawings:

FIG. 11A is a plan view showing a semiconductor acceleration sensor according to a fifth preferred embodiment of the present invention;

FIG. 11B is a sectional view taken along line XIB—XIB in FIG. 11A;

FIG. 11C is a sectional view taken along line XIC—XIC in FIG. 11A;

FIG. 15A is a plan view showing a semiconductor acceleration sensor according to a seventh preferred embodiment of the present invention;

FIG. 15B is a sectional view taken along line XVB—XVB in FIG. 15A;

FIG. 15C is a sectional view taken along line XVC—XVC in FIG. 15A;

FIG. 16A is a plan view showing a semiconductor acceleration sensor according to a eighth preferred embodiment of the present invention;

FIG. 16B is a sectional view taken along line XVIB—XVIB in FIG. 16A;

FIG. 16C is a sectional view taken along line XVIC—XVIC in FIG. 16A;

DETAILED DESCRIPTION OF THE PREFERRED EMBODIMENTS (First Embodiment)

A first embodiment of the present invention will be described with reference to accompanying drawings.

Figure 1:
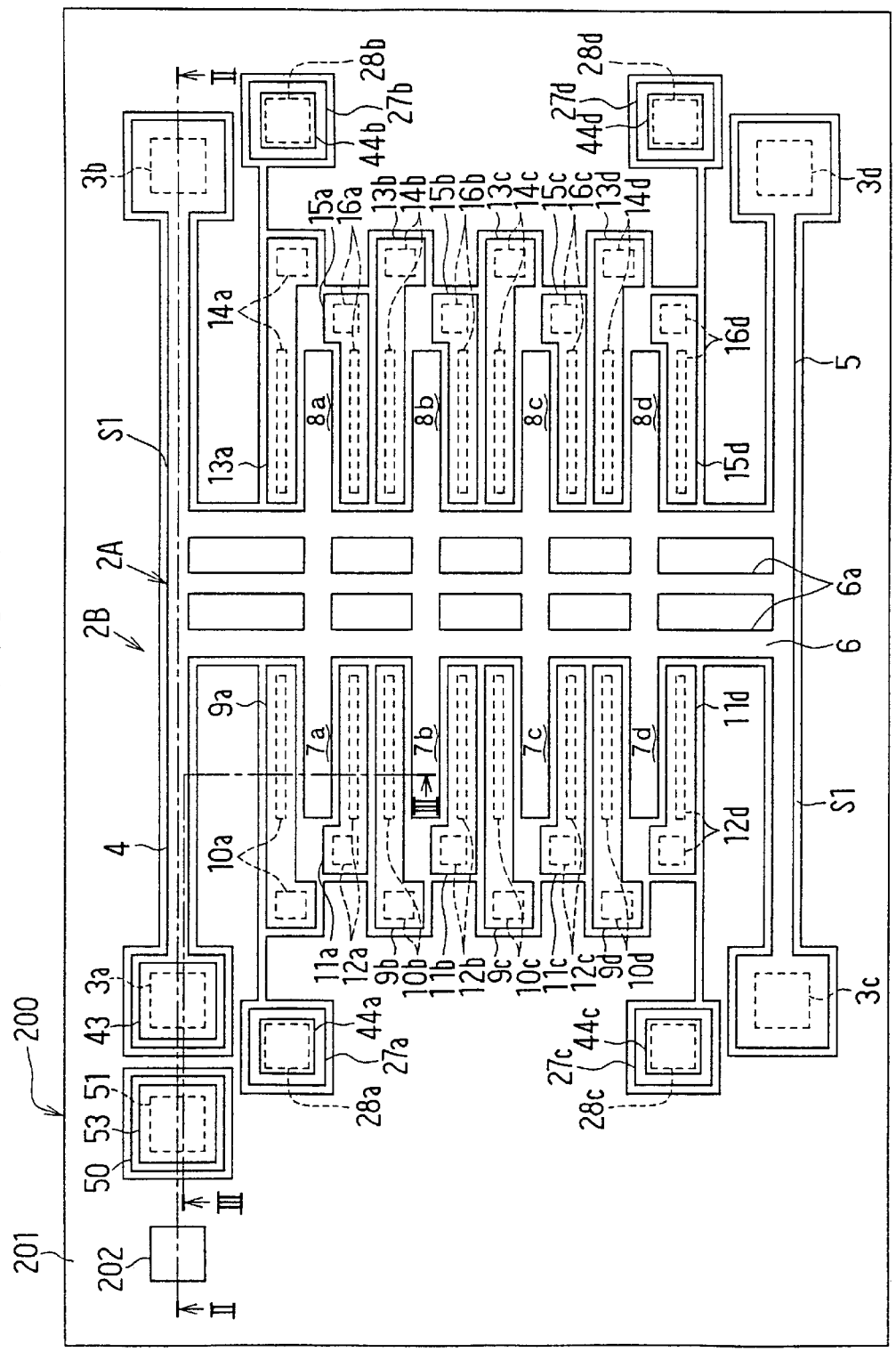
FIG. 1 is a plan view showing a semiconductor acceleration sensor according to a first preferred embodiment of the present invention.
Figure 2:
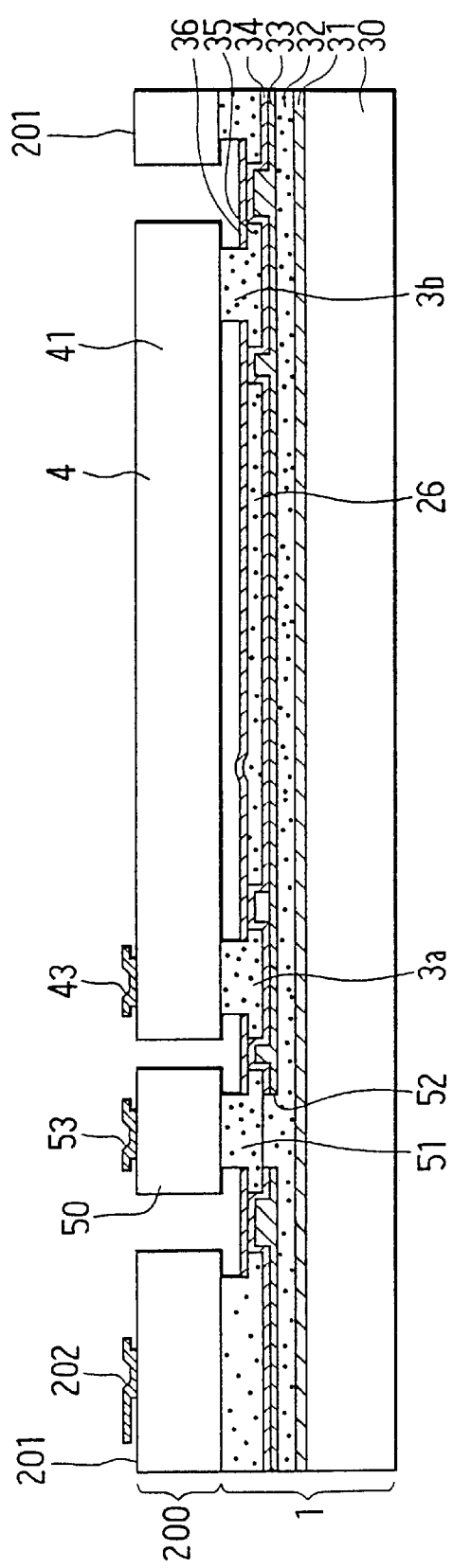
FIG. 2 is a sectional view taken along line II—II in FIG. 1.

As shown in FIG. 1 and FIG. 2, a beam-structure 2A as a movable portion and a fixed portion 2B are disposed on a main surface of a substrate 1. The movable portion and the fixed portion are formed in a manner that a monocrystalline silicon or other like material (monocrystalline semiconductor material) 200 is divided by a trench.

The beam-structure 2A is suspended by four anchors 3a, 3b, 3c and 3d projected from the substrate 1 to be spaced by a given distance from the surface of the substrate 1. The anchors 3a–3d are preferably formed of polycrystalline films. A beam 4 is suspended between the anchors 3a and 3b, while a beam 5 is suspended between the anchors 3c and 3d.

A rectangular mass 6 is further suspended between the beams 4, 5. The mass 6 is formed with through hole 6a which facilitate inflow of an etchant upon sacrificial layer etching.

Four movable electrodes 7a, 7b, 7c and 7d project from one side (left side in FIG. 1) of the mass 6. The movable electrodes 7a–7d are in the form of cantilever, respectively, and extend in parallel to each other with regular intervals therebetween. Similarly, four movable electrodes 8a, 8b, 8c and 8d project from the other side (right side in FIG. 1) of the mass 6. The movable electrodes 8a–8d are in the form of cantilever, respectively, and extend in parallel to each other with regular interval therebetween. The beams 4, 5, the mass 6 and the movable electrodes 7a–7d and 8a–8d are movable after a sacrificial oxide layer is partly removed.

At one side having the movable electrodes 7a–7d, four first fixed electrodes 9a, 9b, 9c and 9d and four second fixed electrodes 11a, 11b, 11c and 11d are fixed on the substrate 1. The first fixed electrodes 9a–9d are supported by anchors 10a, 10b, 10c and 1d, respectively, which project from the substrate 1, and face one side of each of the movable electrodes 7a–7d of the beam-structure 2A, respectively. The second fixed electrodes 11a–11d are supported by anchors 12a, 12b, 12c and 12d, respectively, which project from the substrate 1, and face another side of each of the movable electrodes 7a–7d of the beam-structure 2A, respectively.

Similarly, at one side having the movable electrodes 8a–8d, four first fixed electrodes 13a, 13b, 13c and 13d and four second fixed electrodes 15a, 15b, 15c and 15d are fixed on the substrate 1. The first fixed electrodes 13a–13d are supported by anchors 14a, 14b, 14c and 14d, respectively, which project from the substrate 1, and face one side of each of the movable electrodes 8a–8d of the beam-structure 2A, respectively. The second fixed electrodes 15a–15d are supported by anchors 16a, 16b, 16c and 16d, respectively, which project from the substrate 1, and face another side of each of the movable electrodes 8a–8d of the beam-structure 2A, respectively.

On the substrate 1, four electrode connecting portions 27a, 27b, 27c and 27d are provided, and supported by anchors 28a, 28b, 28c and 28d, respectively, which project from the substrate 1.

As shown in FIG. 2, the substrate 1 has a laminated structure, wherein an oxide film 31, an attaching film 32, such as polysilicon film, insulating film 33, such as silicon oxide film, an insulating film 34, a conductive film 35, for example, impurity doped polysilicon film such as phosphorus and an insulating film 36 are laminated on a silicon substrate 30 in the above order. Here, the insulating films 34, 36 are formed from a hard-etching film that is not etched easily by a etchant in a sacrificial layer etching described later. For example, when the etchant is HF (hydrofluoric acid), a silicon nitride film is employed as the insulating films 34, 36, because an etching rate of the silicon nitride film is smaller than that of the silicon oxide film.

The anchors 3a, 3b are formed from the conductive film 35. Similarly, the other anchors (not shown in FIG. 2) such as anchors 3c, 3d, 10a–10d, 12a–12d, 14a-14d, 16a–16d and 28a–28d are formed from the conductive film 35, respectively.

The conductive film 35 forms a wire which electrically connects the first fixed electrodes 9a–9d and the electrode connecting portions 27a, the first fixed electrodes 13a–13d and the electrode connecting portions 27b, the second fixed electrodes 11a–11d and the electrode connecting portions 27c, and the second fixed electrodes 15a–15d and the electrode connecting portions 27d, respectively. The conductive film 35 also forms a lower electrode 26 which is an electrostatic force preventing fixed electrode. The lower electrode 26 faces the beam-structure 2A on the surface of the substrate 1.

As shown FIG. 1 and FIG. 2, an electrode pad 43 made of an aluminum film is provided on the anchor 3a. Electrode pads 44a, 44b, 44c and 44d made of an aluminum film are provided on the electrode connecting portions 27a–27d, respectively.

In the above structure, a first capacitor is formed between the movable electrode 7a–7d of the beam-structure 2A and the first fixed electrodes 9a–9d, while a second capacitor is formed between the movable electrode 7a–7d of the beam-structure 2A and the second fixed electrodes 11a–11d, respectively. Similarly, a first capacitor is formed between the movable electrode 8a–8d of the beam-structure 2A and the first fixed electrodes 13a–13d, while a second capacitor is formed between the movable electrode 8a–8d of the beamstructure 2A and the second fixed electrodes 15a–15d, respectively.

Based on the capacitance changes of the first and second capacitors, the sensor detects a force generated by vehicle acceleration and applied the beam-structure 2A is detected. In detail, two differential capacitors are formed between the movable electrodes and the fixed electrodes. The acceleration can be detected by using a circuit shown in FIG. 10, inputting two capacitance outputs from the differential capacitors.

As shown FIG. 1 and FIG. 2, a potential outputting portion 50 is provided for fixing a potential of the attaching film 32. The potential outputting portion 50 is supported by an anchor 51 formed in the substrate 1. The anchor 51 is also formed from conductive film 35. At a portion where the potential outputting portion 50 is provided, the silicon oxide film 33 and insulating film 34 have an opening 52, where the attaching film is electrically connected to the potential outputting portion 50 via the anchor 51. On the potential outputting portion 50, an electrode pad 53 made of an aluminum film is provided. Because this structure enables the potential of the attaching film 32 to be fixed, the parasitic capacitance can be decreased. Therefore, it can prevent sensing sensitivity caused by the parasitic capacitance of the attaching thin film from decreasing.

Next, a fabrication process of the semiconductor acceleration sensor will be described hereinafter with reference to FIGS. 3A–3N.

Figure 3A:
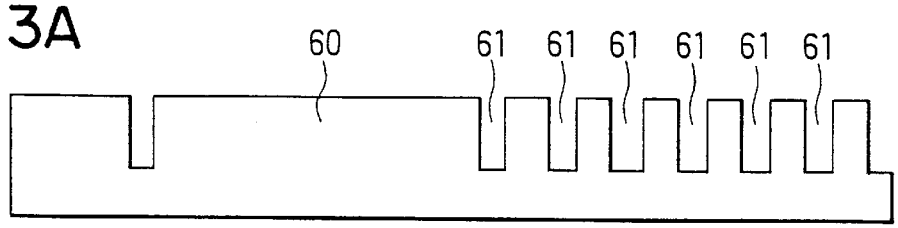
FIGS. 3A–3N are diagrams for explaining a fabrication process of the semiconductor acceleration sensor shown in FIG. 1, taken along line III—III in FIG. 1.

As shown in FIG. 3A, a monocrystalline silicon substrate 60 as the first semiconductor substrate is provided. A trench 61 is formed in the monocrystalline silicon substrate 60 by trench etching. This trench 61 separates the beam-structure 2A from a fixed portion 2B.

Figure 3B:
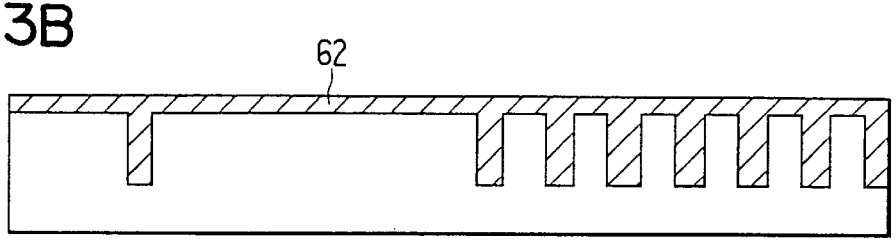

Next, as shown in FIG. 3B, a silicon oxide film 62 as a sacrificial layer is formed by deposition such as CVD (chemical vapor deposition), and then a surface of the silicon oxide film 62 is flattened.

Figure 3C:
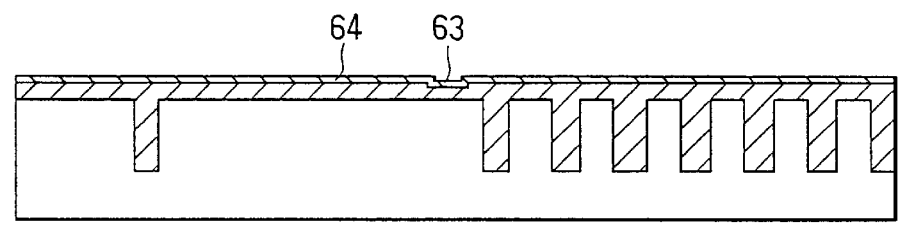

Next, as shown in FIG. 3C, the silicon oxide film 62 is subjected to photolithography and dry etching so that a concave portion 63 is formed. After that, a silicon nitride film 64 is formed on the silicon oxide film 62 to enlarge the roughness of the concavo-convex on the surface and to make an etching stopper in the sacrificial etching.

Figure 3D:
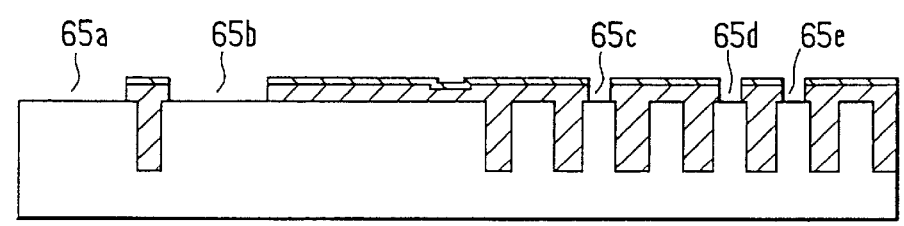

As shown in FIG. 3D, a laminated structure of the silicon oxide 62 and the silicon nitride is subjected to photolithography and etching such as dry etching to form openings 65a, 65b, 65c, 65d and 65e at regions where anchors will be formed. These openings 65a–65e are used for connecting a beam-structure and a lower electrode and for connecting fixed electrodes and a wire pattern.

Figure 3E:
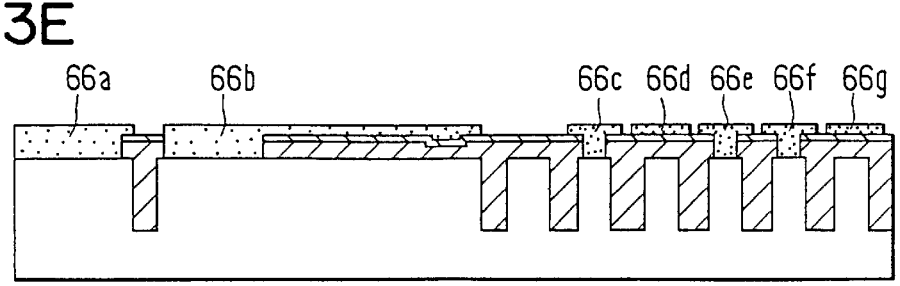

Subsequently, as shown in FIG. 3E, a polysilicon film is formed on the silicon nitride film 64 including the openings 65a–65e, and then impurities are introduced through P (phosphorus) diffusion. Thereafter, through photolithography, patterns 66a, 66b, 66c, 66d, 66e, 66f and 66g of anchors, wire pattern and lower electrodes are formed. In this way, an impurity-doped polysilicon film 66 (66a–66g) as a conductive film is formed at given regions including openings 65a–65e on the silicon nitride film 64. A thickness of the polysilicon film is approximately 1 $\mu$m–2 $\mu$m.

In the step where the impurity-doped polysilicon film 66 is formed at given regions including openings 65a–65e on the silicon nitride film 64, since the polysilicon film 66 is thin (for example, 1 $\mu$m–2 $\mu$m) enough to satisfy the lower pattern resolution of a stepper, the shapes of the openings 65a–65e of the silicon nitride film 64 can be seen through the polysilicon film 66 so that photomask matching can be performed with accuracy.

Figure 3F:
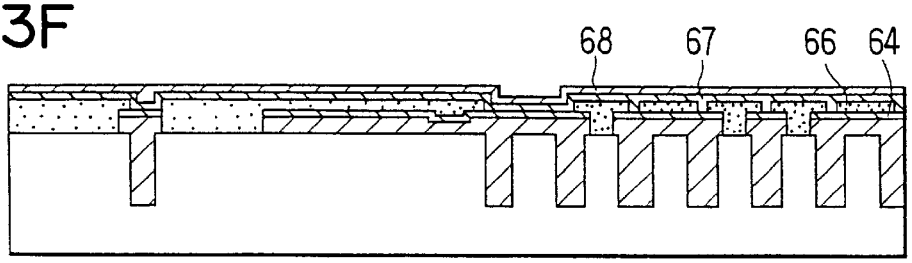

Then, as shown in FIG. 3F, a silicon nitride film 67 is formed on the polysilicon film 66 and silicon nitride film 64. Further, a silicon oxide film 68 is formed on the silicon nitride film 67.

Figure 3G:
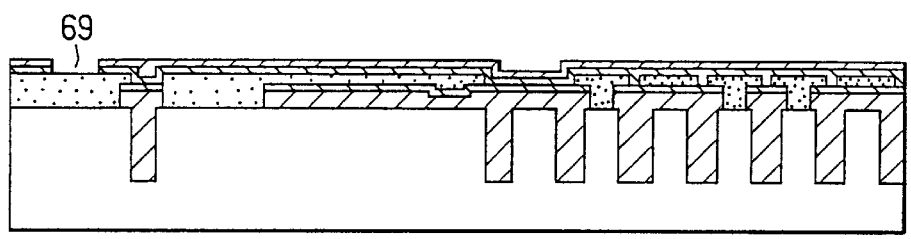
Figure 3H:
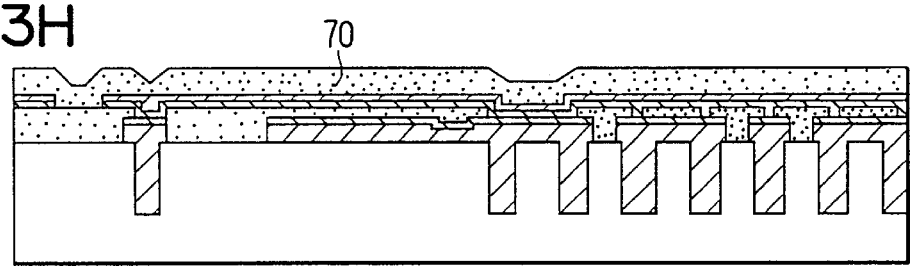

After that, as shown in FIG. 3G, through photolithography, an opening 69 is formed in the silicon nitride oxide film 68 and silicon nitride film 67 by dry etching or the like.

Then, as shown in FIG. 3E, a polysilicon film 70 as an attaching film is formed on the silicon oxide film 68 including the opening 69. Since the polysilicon film 70 is connected to the polysilicon film 66a through the opening 69, a potential of the polysilicon film 70 can be outputted through the polysilicon film 66a.

Figure 3I:
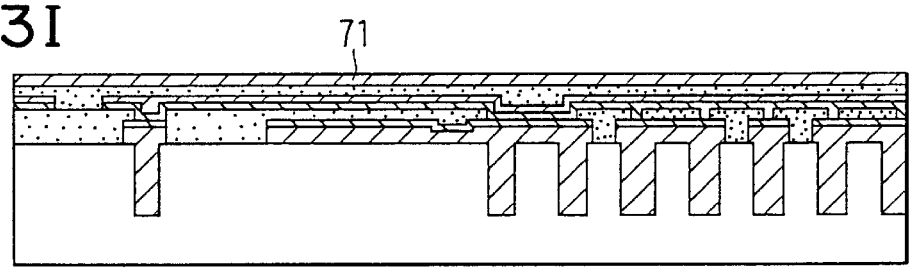

Next, as shown in FIG. 3I, a surface of the polysilicon 70 is flattened by mechanical polishing or the like, and a silicon oxide film 71 is formed on the polished polysilicon 70 to simplify attachment.

Figure 3J:
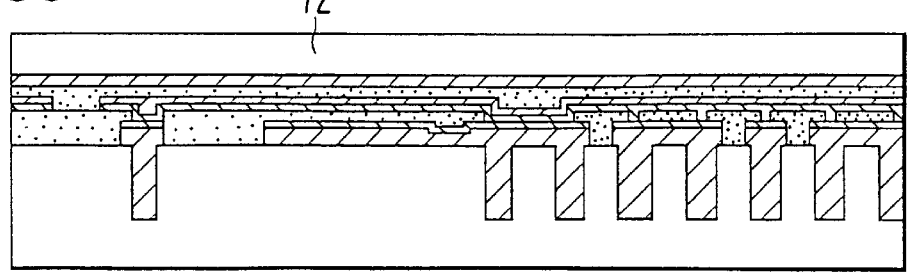

Next, as shown in FIG. 3J, a monocrystalline silicon substrate (support substrate) 72 is provided, and a surface of the polysilicon film 70 is attached to the flattened surface of the monocrystalline silicon substrate 72.

Figure 3K:
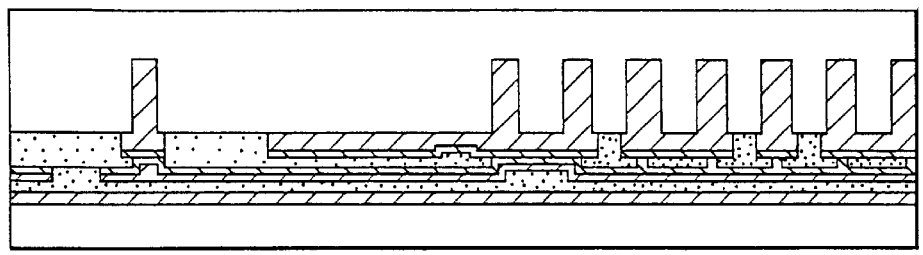
Figure 3L:
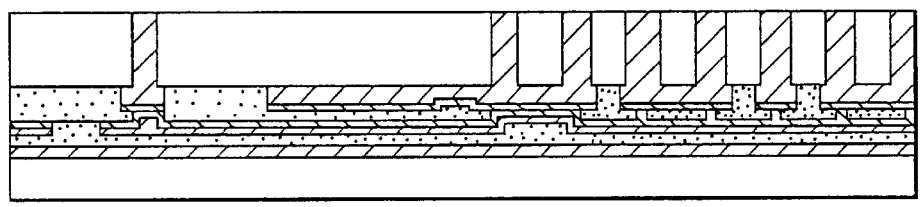

Further, as shown in FIG. 3K, the laminated structure shown in 3J is turned upside down, and the silicon substrate 60 is mechanically polished to a given thickness, as shown in FIG. 3L. In this case, when the polishing advances until the silicon oxide film 62 appears, the hardness of the surface changes while polishing. Thereby enabling termination of polishing to be easily detected.

Figure 3M:
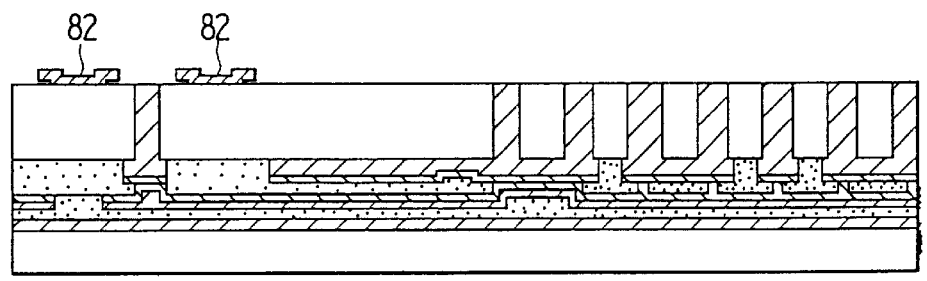

After that, as shown in FIG. 3M, an aluminum electrode 82 is formed through deposition of aluminum material and photolithography.

Figure 3N:
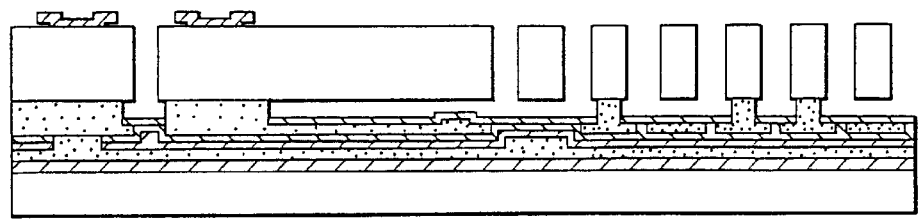

Finally, as shown in FIG. 3N, the silicon oxide film 62 is removed through etching using an HF etchant to cause a beam-structure having movable electrodes. Specifically, given portions of silicon oxide film 62 are removed through sacrificial layer etching using the etchant to render the silicon substrate 60 movable. In this case, a sublimation agent, such as paradichlorobenzene, is used for preventing the movable portions from being stuck onto the substrate during drying after etching.

In this way, a semiconductor acceleration sensor can be formed using the buried SOI (Silicon On Insulator) substrate and forming the wire pattern and lower electrode each of which is separated by the insulators.

Here, in this embodiment, the silicon oxide film 62 is employed as the sacrificial layer and the silicon film 66 is employed as the conductive film, and the HF etchant is used. Since silicon oxide is dissolved by the HF etchant while polysilicon is not dissolved by the HF etchant, it is not necessary to accurately control the concentration and the temperature of the HF etchant or the termination of etching so that production can be facilitated.

Regarding the first embodiment, the following changes can be adapted.

Figure 4:
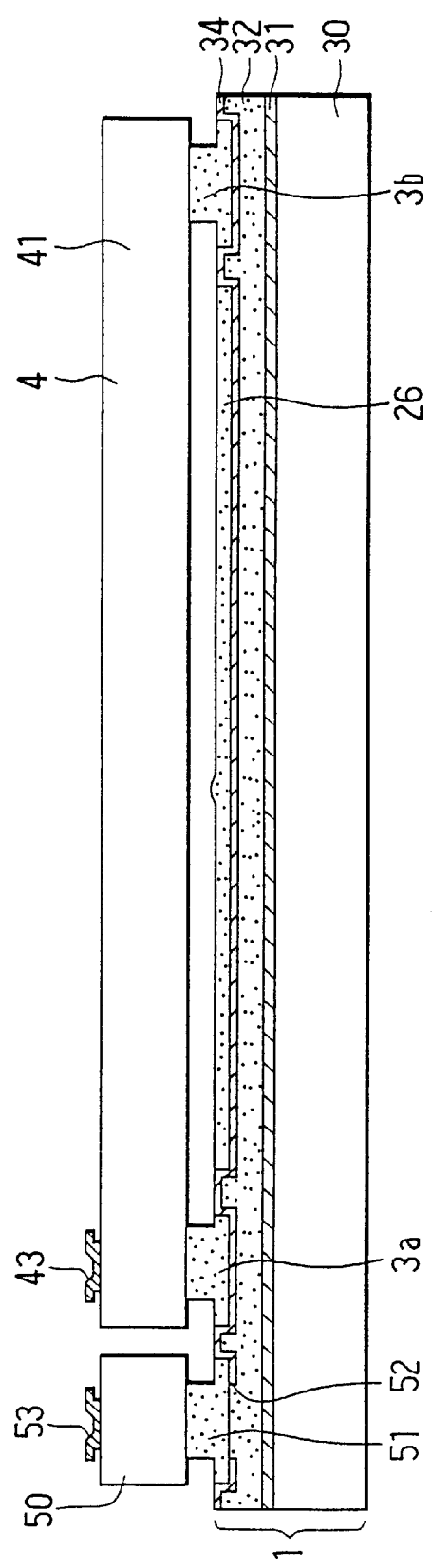
FIG. 4 is a sectional view taken along line II—II in FIG. 1.

In the above facilitation process, since the silicon nitride film 67 (silicon nitride film 34 in FIG. 2) is formed under the anchor, a breakaway of the anchor can be prevented even if upper portion of the silicon nitride film 67 (silicon nitride film 34 in FIG. 2) is over-etched in the sacrificial etching. However, when the silicon oxide film is eliminated as shown in FIG. 4, the silicon oxide film can be also eliminated. Here, since only the silicon nitride film 67 is formed on the polysilicon film 66, a step of the polysilicon film 70 for attaching at the opening 69 can be decreased, thereby facilitating mechanical polishing for flattening.

(Second Embodiment)

Figure 5:
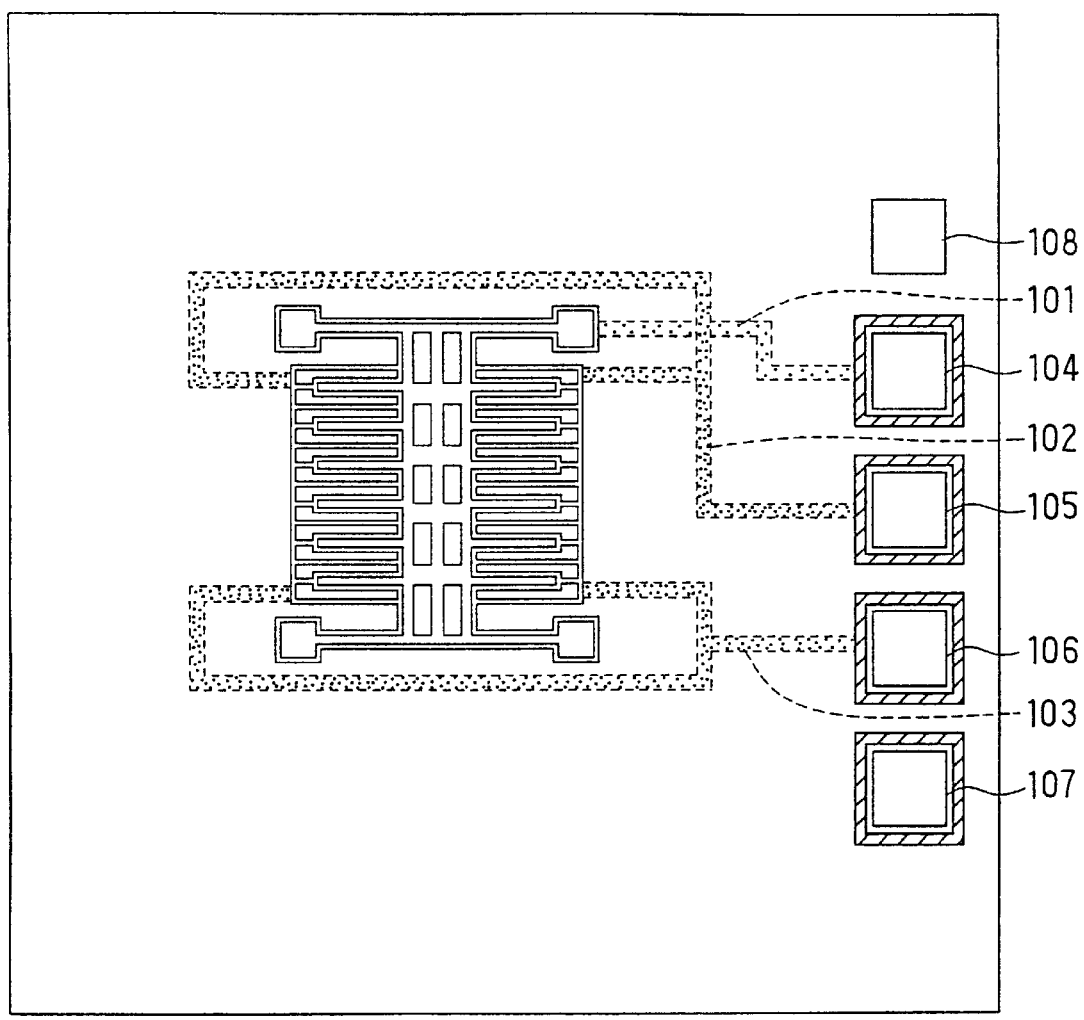
FIG. 5 is a plan view showing a semiconductor acceleration sensor according to a second preferred embodiment of the present invention.

In the second embodiment, as shown in FIG. 5, electrode pads 104, 105, 106, 107 and 108 are provided at the one surrounding side on the surface of the sensor chip.

In this case, the electrode pad 104 is electrically connected to the beam-structure 2A via a wire 101 formed from conductive film 35. The electrode pad 105 is electrically connected to the fixed electrodes 9a–9d and 13a–13d via a wire 102 formed from conductive film 35, while the electrode pad 106 is electrically connected to the fixed electrodes 11a–11d and 15a–15d via a wire 103 formed from conductive film 35.

The electrode pad 107 is electrically connected to the attaching film 32 via the conductive film 35 as the anchor provided under the electrode pad 107. The electrode pad 108 is provided for fixing a potential of the silicon substrate.

Figure 6A:
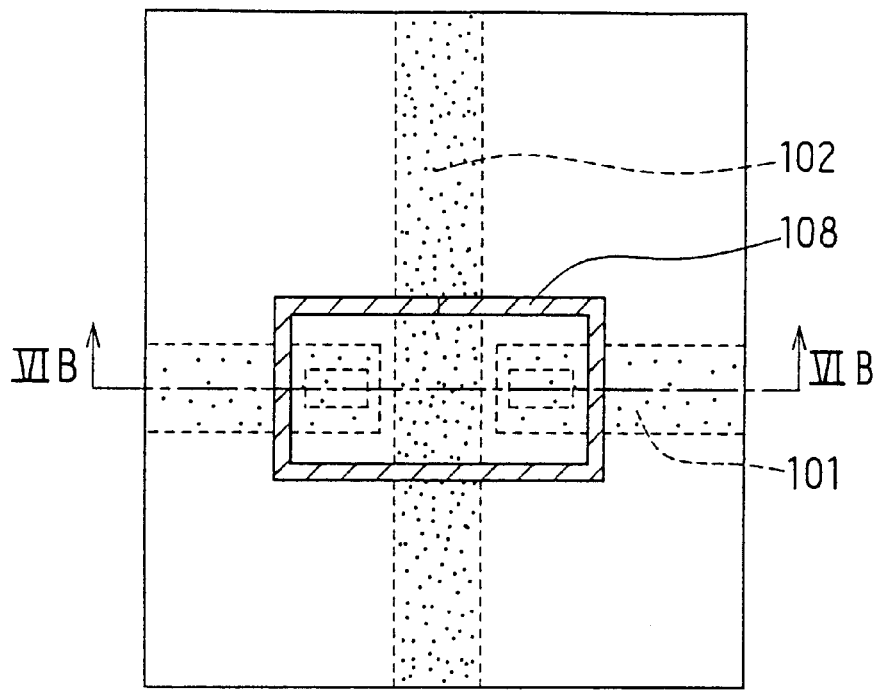
FIG. 6A is a plan view showing a semiconductor acceleration sensor shown in FIG. 5.
Figure 6B:
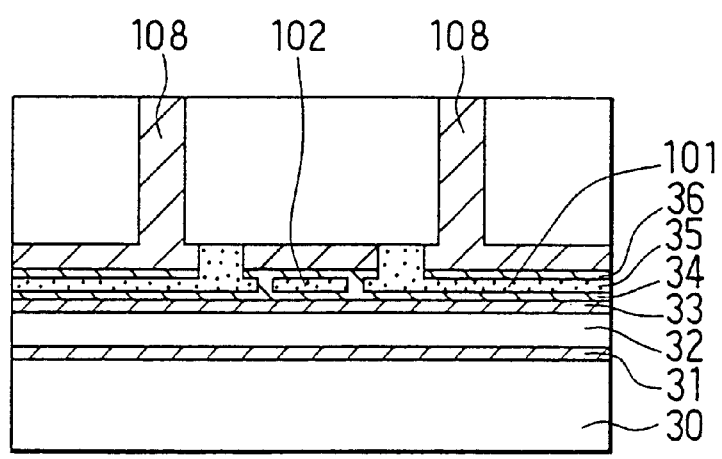
FIG. 6B is a sectional view taken along line VIB—VIB in FIG. 6A.

In this structure, the wire 101 and the wire 102 intersect. In this case, as shown in FIGS. 6A and 6B, the intersection portion is electrically divided from the other silicon substrate with an insulating film 108, and the wire 101 is connected via the divided substrate including the intersection. Specifically, a three-dimensional structure using the silicon substrate can be employed. To provide this structure shown in FIG. 6B, the fabrication processes described in FIGS. 3A, 3B and 3D are changed as follows. A trench (not shown) is further formed at a region where the intersection will be formed to cover the intersection in FIG. 3A. The trench is filled with the silicon oxide film 62 in FIG. 3B. An opening (not shown) is further formed at a region where the wire will be bypassed or where the intersection will be formed. However, in this way, there is a possibility of causing a breaking of the wire or changing the accuracy in processing a side wall of the beam-structure by inflow of the etchant because of the formation of an additional trench.

Figure 7A:
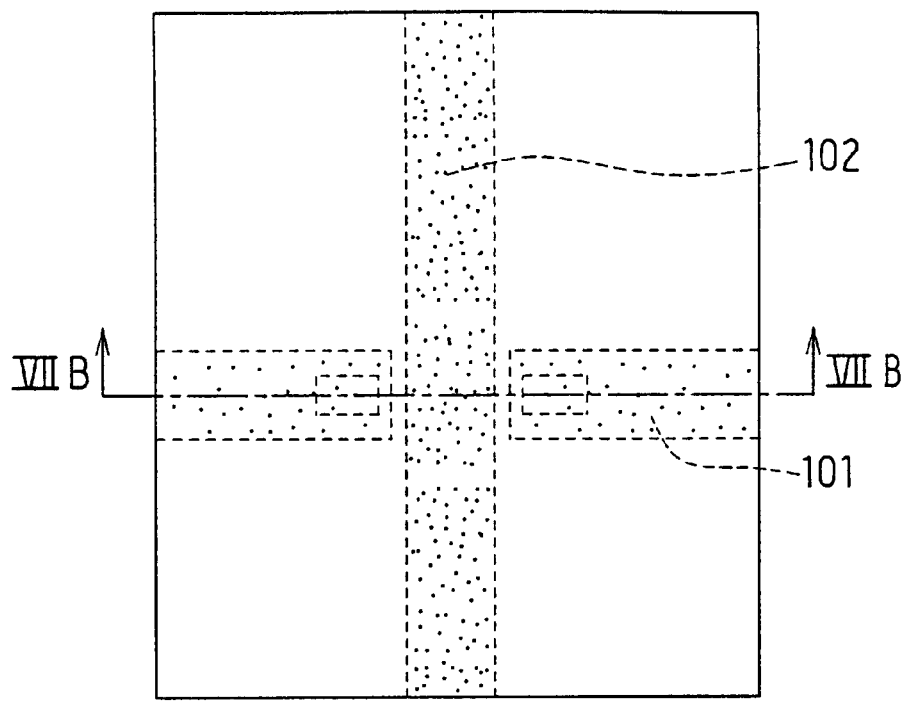
FIG. 7A is a plan view showing a semiconductor acceleration sensor shown in FIG. 5.
Figure 7B:
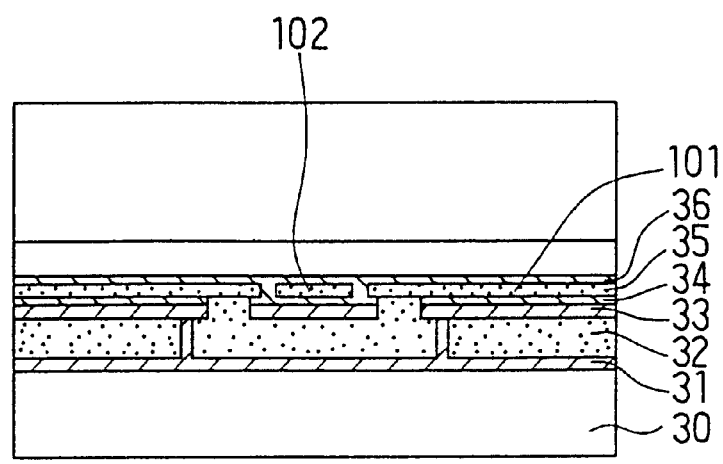
FIG. 7B is a sectional view taken along line VIIB—VIIB in FIG. 7A.

Therefore, as shown in FIGS. 7A and 7B, an opening is formed in the silicon oxide film 33 and silicon nitride film 34, and the wire 101 is formed to bypass by using the attaching film 32. In this way, the accuracy in processing the side wall of the beam-structure by inflow of the etchant can be prevented from changing because it is not needed to form additional trench.

(Third Embodiment)

Figure 8:
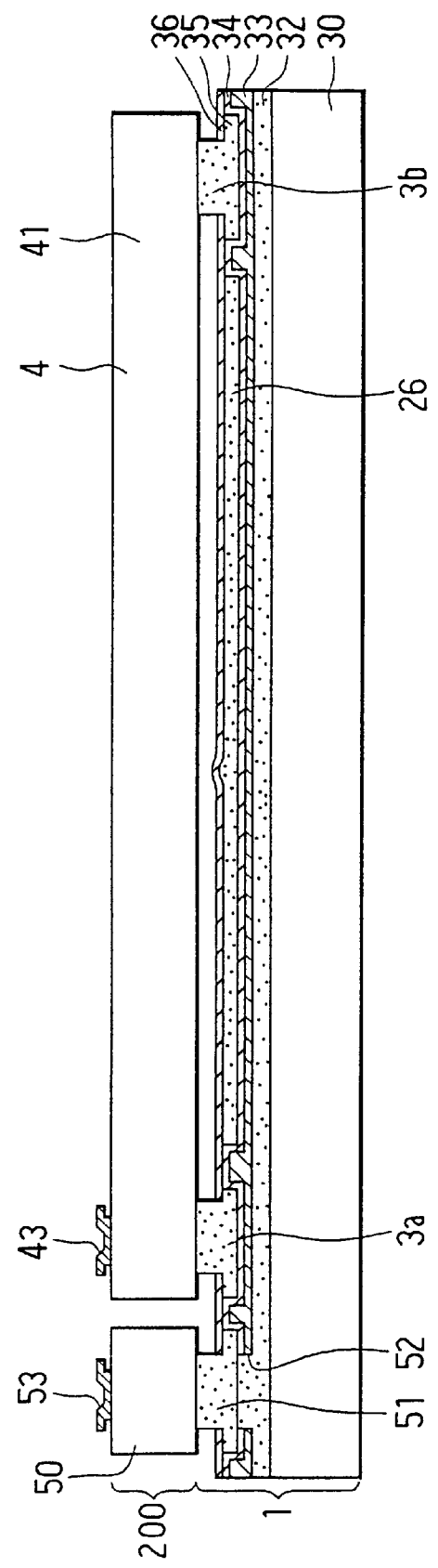
FIG. 8 is a sectional view showing a semiconductor acceleration sensor according to a third preferred embodiment of the present invention.

A third embodiment of the present invention will be described with reference to FIG. 8. A plan view of an acceleration sensor in the third embodiment is the same as that of the first embodiment (FIG. 1). The difference between the first and the third embodiment is that the oxide film 31 in the first embodiment is not formed in the third embodiment. The other portion and fabrication process are substantially the same. The difference will be explained hereinafter.

When the sensor is formed with no oxide film 31 as in FIG. 2, the attaching film 32 is electrically connected to the silicon substrate 30. However, after the silicon substrate 30 is formed to one chip, an interface between a package and the silicon substrate 30 has a very high contact resistance due to a natural oxide or the like that is formed on a back surface of the silicon substrate 30 (lower part in FIG.8).

Therefore, by outputting the potential of the attaching film 32 (and the potential of the silicon substrate 30 connected thereto), this embodiment can also decrease the parasitic capacitance of the attaching thin film and prevent sensing sensitivity from decreasing due to the parasitic capacitance of the attaching thin film 32 when there is no oxide 31.

(Fourth Embodiment)

In the fourth embodiment, each part of the sensor structure, which parasitic capacitance is formed with the movable electrodes, is discussed. With the structural feature which eliminates an influence of the parasitic capacitance being explained in detail.

Figure 9:
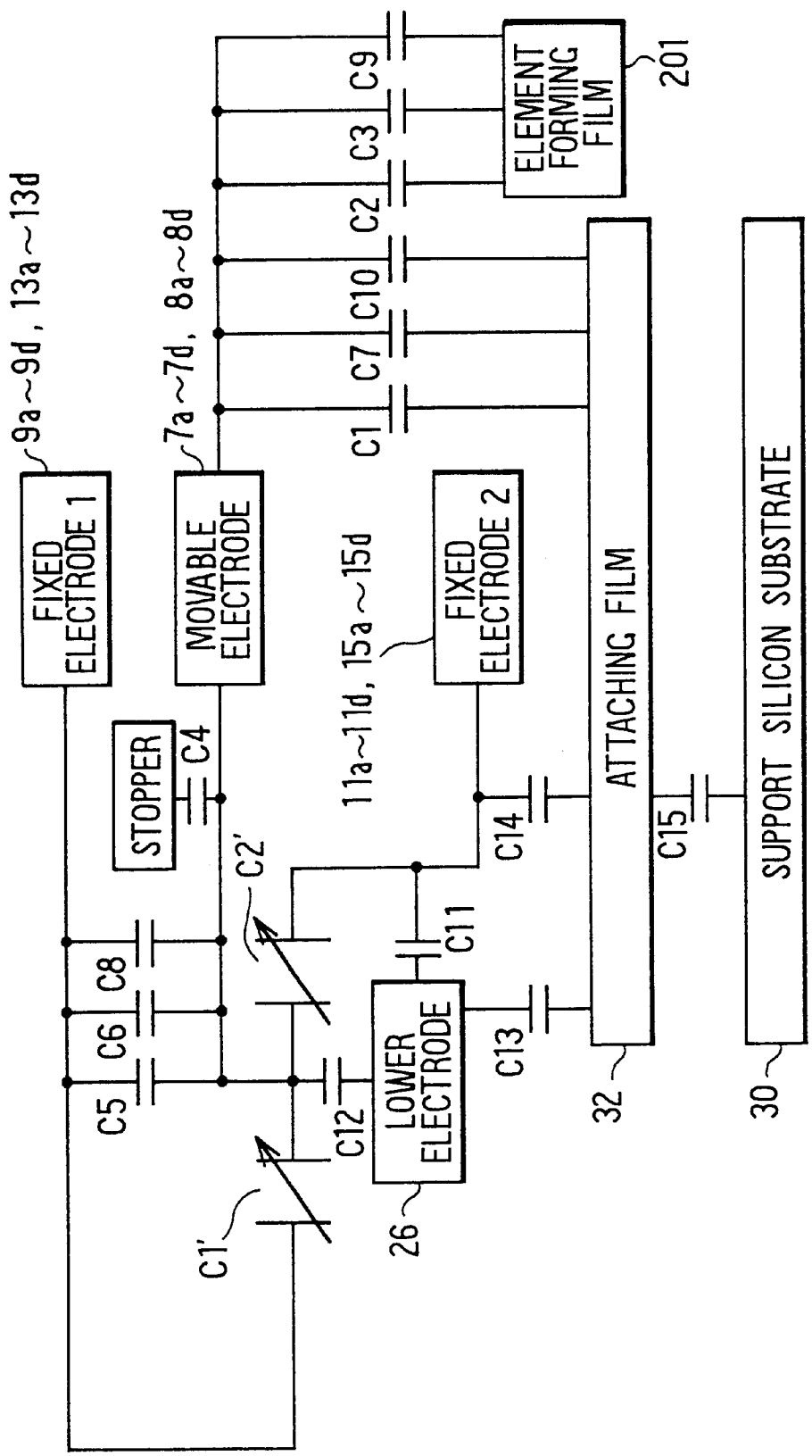
FIG. 9 is a figure explaining parasitic capacitance formed in a semiconductor acceleration sensor according to a fourth preferred embodiment of the present invention.

In FIG. 9, a support silicon substrate 30 corresponds to the silicon substrate 30 in the above embodiments. An element forming film corresponds to a surrounding portion 20 which surrounds the beam-structure 2A and fixed electrodes 9a–9d, 11a–11 *d*, 13a–13d and 15a–15d (in other words, sensor element portion) by a trench S1 interposed therebetween (see FIGS. 1 and 2). A lower electrode corresponds to the lower electrode 26 in the above embodiments. A stopper, which is not shown in the above embodiments, prevents the movable electrodes 7a–7d and 8a–8d from moving excessively.

Here, as shown in FIG. 2, the surrounding portion 201 is formed from the monocrystalline silicon 200 fixed to the conductive film 35, and is one part of the fixed portion 2B on the monocrystalline silicon 200.

In FIG. 9, a fixed electrode 1 corresponds to the first fixed electrodes 9a–9d and 13a–13d, a fixed electrode 2 corresponds to the second fixed electrodes 11a–11d and 15a–15d, a movable electrode corresponds to the movable electrodes 7a–7d and 8a–8d, C1' and C2' correspond to capacitance of the first and second capacitor, respectively, C1–C15 correspond to parasitic capacitances formed between each part. These parasitic capacitances include capacitances formed among not only each of electrodes but also each of the wires.

Figure 10:
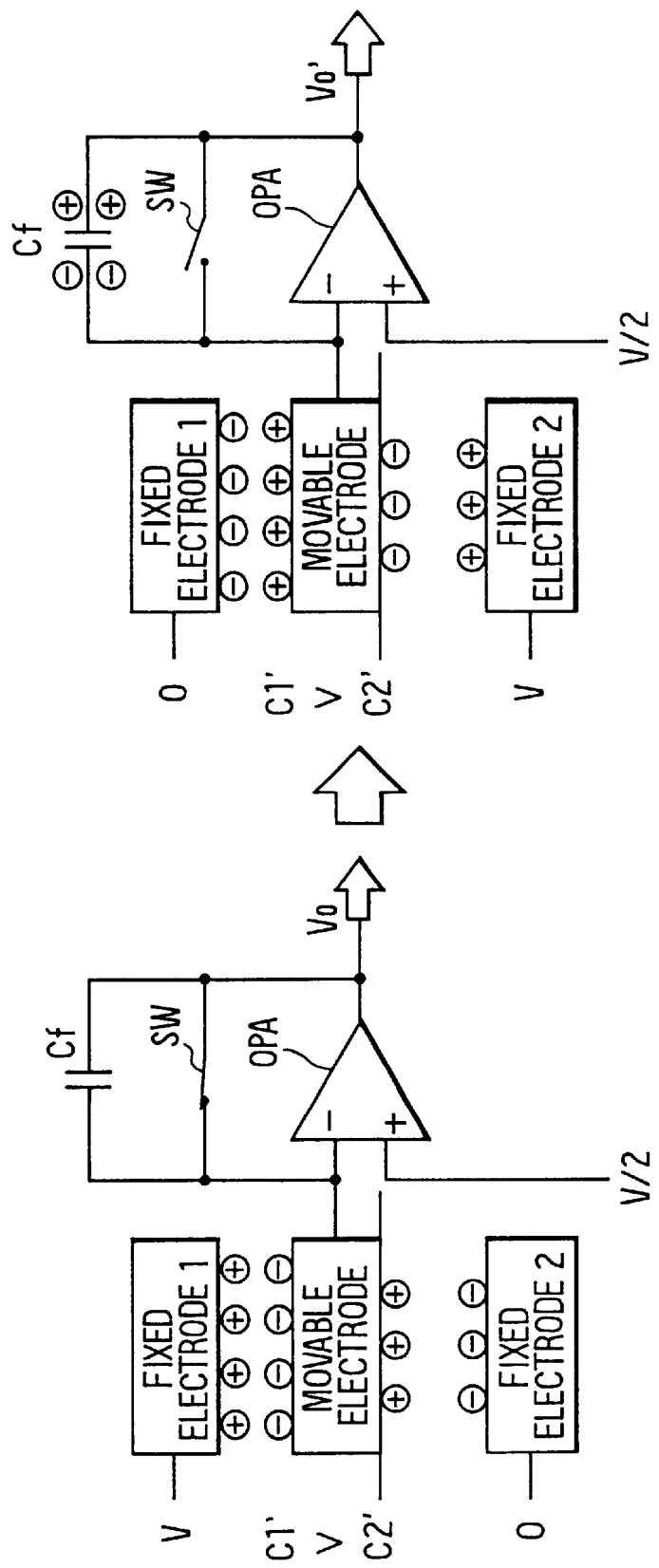
FIG. 10 is an explanation figure for explaining parasitic capacitance shown in FIG. 9.

In the above embodiments, the sensor detects a capacitance change between the movable electrode and the fixed electrode from an output of the movable electrode. Referring to FIG. 10, a fixed electrode 1, a fixed electrode 2, a movable electrode and parasitic capacitances C1' and C2' are defined the same way as those in the FIG. 9.

A detecting circuit, as shown in FIG. 10, is a so-called switched-capacitor circuit. In this circuit, at first, a capacitor Cf is short-circuited by a switch SW. In this situation, the fixed electrode 1, 2 are biased to V and 0 (zero) volt, respectively, and the movable electrode is biased to V/2 volt (shown as OPA). Next, after the switch SW is turned off (opened), biased voltages of the fixed electrodes 1, 2 are reversed, respectively. In this situation, a balance of charge among the fixed electrodes 1,2 and movable is changed, and a changed electric charge is charged to the capacitor Cf. An electric charge value in the capacitor Cf is translated to a voltage value indicating a capacitance change, and the voltage is output.

Therefore, as shown in FIG. 9, parasitic capacitances whose potentials are not fixed, out of the parasitic capacitances C1–C10 formed with respect to the movable electrode, influence the output. In detail, the voltage change leads to the change of the electric charge in the parasitic capacitance. This change leads to the change of the electric charge in the capacitor Cf. This change leads to the output change.

Now, the lower electrode and the stopper, which are one of the portions which generate parasitic capacitances with the movable electrode, are biased to the same voltage as the movable electrodes. As the lower electrode is provided for prevent the movable electrode from being attached onto the substrate 1. The stopper is provided for preventing the movable electrode from moving excessively. Since the stopper has a possibility to attach to the movable electrode, the stopper is applied with given voltage to prevent the movable electrode from being attached onto it. Therefore, the parasitic capacitances C4 and C12, whose amount of charge does not change, does not influence the output.

The parasitic capacitances C5, C6 and C8 also do not influence the output, because the fixed electrodes are biased to a given potential.

Therefore, the rest of the parasitic capacitances C1, C7, C10, C2, C3 and C9, formed between the attaching Poly-Si (attaching film 32) and the movable electrode and between the element forming film (surrounding portion 201) and the movable electrode, influence the output.

In the first, second and third embodiments, a potential of the attaching Poly-Si is fixed to eliminate the influence of the C1, C7 and C10.

This fourth embodiment characterizes that a potential of the element forming film (surrounding portion 201) is fixed to eliminate the influence of the parasitic capacitances. A parasitic capacitance, formed between the element forming film (specifically, surrounding portion 201) and the movable electrode, is formed mainly at a portion next to the beams 4, 5 with a gap S1 (the trench S1) interposed therebetween as shown in FIG. 1. A width of this gap S1 is formed less than approximately 10 µm. Because the width of the gap S1 is narrow, the influence of the parasitic capacitances is magnified.

Then, as shown in FIGS. 1 and 2, a pad 202, formed from aluminum film or the like, as potential fixing means is formed at the surrounding portion 201, is biased from a control circuit (not shown) to fixed a potential of the surrounding portion 201. By fixing the potential, a charge in the parasitic capacitance formed between the surrounding portion 201 and the movable electrode is eliminated, and fluctuation of an output voltage can be restricted.

Now, as a further preferred embodiment, combination the above embodiments can be made. Specifically, a combination in which the potential of the surrounding portion 201 (the fourth embodiment) is combined with the potential of the attaching film 32 (the first, second and third embodiments) can also eliminate the influence of the parasitic capacitance.

As a further preferred embodiment, the potential, fixing the surrounding portion 201 or attaching film 32, may be a potential biased to the movable electrodes 7a–7d and 8a–8d. Specifically, v/2 (volt) may be biased to a non-inverting terminal of an OP amp shown in FIG. 10. According to this structure in which the surrounding portion 201 or the attaching film 32 is the same potential as that of the movable electrode, the parasitic capacitance does not increase the electric charge, and the influence of the parasitic capacitance can thus be sufficiently eliminated. Here, the biased voltage of the non-inverting terminal of an OP amp can be selected within a range from 0 to V volts.

(Fifth embodiment)

In this fifth embodiment, shown in FIGS. 11A, 11B and at 11C, the surrounding portion potential fixing means is adapted to another acceleration sensor that has a different structure from the above embodiments, specifically, a capacitive acceleration sensor employing an SOI wafer.

This sensor is formed by processing a SOI wafer 300 formed by attaching a first silicon substrate 301 as the support substrate and a second silicon substrate 302 as the element forming film with an insulating film 303 made of SiO2 interposed therebetween.

Then, similar to the above embodiments, a sensor element portion is formed on the second silicon substrate (the element forming film). The sensor element portion includes movable electrodes 304, 305, fixed electrodes 306, 307, anchors 308, 309, first pads 310, 311 for biasing a potential to the fixed electrodes, a second pad 312 for leading an output from the movable electrodes, wires 310a, 311a and so on. At the surrounding portion or peripheral portion of the sensor portion, a surrounding portion 313 is formed with a trench S2 interposed therebetween.

Specifically, two anchors 308, 309 are supported on the first silicon substrate 301 via an insulating film 303. Curved (turned) beams 314, 315 are connected to each of the anchors 308, 309, respectively. Further, at a region between the beam 314 and the beam 315, a rectangle shaped mass 316 is connected to each of the beams 314, 315.

The movable electrodes 304, 305, which are in the form of cantilever, are projected from both sides of the mass 316. The movable electrodes 304, 305 face the fixed electrodes 306, 307, respectively. In FIG. 1A, a first capacitance detecting portion is formed from the movable electrode 304 and the fixed electrode 306 facing the movable electrode 304 at the left side of the mass 316, a second capacitance detecting portion is formed from the movable electrode 305 and the fixed electrode 307 facing the movable electrode 305 at the right side of the mass 316. Therefore, in this embodiment, the sensor element portion includes two capacitance detecting portions.

In this embodiment, the same as the above embodiments, the beam-structure 2A as the movable electrode comprises movable electrodes 304, 305, beams 314, 315 and the mass 316.

The movable electrodes 304, 305 are electrically connected to the movable electrode pad 312 via the anchor 309, the fixed electrode 306 is electrically connected to the fixed electrode pad 310 via the wire 310a, and the fixed electrode 307 is electrically connected to the fixed electrode pad 311 via the wire 311a.

The laminated structure of the first silicon substrate 301 and the insulating film 303 has an opening area 300a. The opening area 300a of the first silicon substrate 301 is shown by the dotted line in FIG. 11A. The opening area 300a is formed under a position of the movable electrodes 304, 305, the mass 316 and intersection of the movable electrode and fixed electrodes 306 and 307 are formed.

When a force generated by a vehicle acceleration is applied to this sensor J1 in the horizontal direction, the mass 316 moves in the same horizontal direction (opposite direction). The amount of movement is determined by a weight of mass 316, the restoring force of beams 314, 315 and an electrostatic force among each electrodes. Since the amount of the moving indicates a change in a capacitance, the amount of the electric charge among the electrodes also changes, and the acceleration can be detected.

This kind of sensor structure can be fabricated by the following processes. Etching such as dry etching is applied to a surface of the second silicon substrate 302 of the SOI wafer 300. The movable electrodes, fixed electrodes, pads and so on are formed. Next, anisotropic etching using an alkaline etchant such as KOH or the like is applied to the first silicon substrate 301 side. The one part of insulating film which fixes the movable electrodes and the fixed electrodes are removed by etching to make the beam-structure including the movable electrode movable.

As described above, since this acceleration sensor J1 has the opening area 300a, the first silicon substrate 301 as the support substrate does not exist under the position of the movable electrodes and fixed electrodes. Therefore, since the attaching film does not exist either under the position of the movable electrodes and the fixed electrodes, the parasitic capacitance formed between the attaching film 32 and movable electrodes described above does not exist.

However, regarding the capacitive acceleration sensor J1 using the SOI substrate, potentials of each portion except the electrodes are not fixed (but floated). Therefore, parasitic capacitance is formed not only in the capacitance of the capacitance detecting portion between the movable electrodes and fixed electrodes but also in the surrounding portion. Therefore, when an electric charge in the parasitic capacitance of the surrounding portion is not controlled, an electric charge on the capacitance detecting portion may be changed because of capacitance coupling. Thus, the acceleration may not be detected with accuracy or output voltage may be fluctuated.

Figure 12:
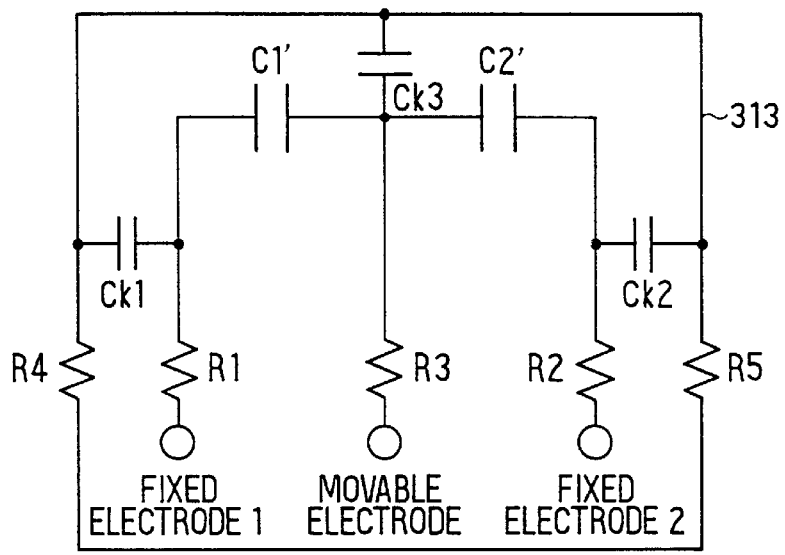
FIG. 12 is an equivalent circuit of the semiconductor acceleration sensor shown in FIG. 11A.

A mechanism of the above point will be explained hereinafter in detail with reference to FIG. 12. In FIG. 12, a fixed electrode 1 corresponds to the fixed electrode 306 in FIG. 11A. Similarly, a fixed electrode 2 corresponds to the fixed electrode 307. A movable electrode corresponds to the movable electrodes 304, 305. C1' and C2' correspond to a capacitance between the fixed electrode and the movable electrode which is the capacitance detecting portion. R1–R5 correspond to resistance of each portion. Each capacitance C1', C2' is changed by the applied acceleration.

In the case of the structure using the SOI wafer, parasitic capacitances CK1, CK2 and CK3 are formed at the surrounding portion 313. Therefore, electric charge in the CK1, CK2 and CK3 must be prevented from fluctuating. However, in the above structure shown in FIG. 11A, the potential of the one side of the parasitic capacitance (specifically, the potential of surrounding portion 313) is floated, and the electric charge in the parasitic capacitance CK1, CK2 and CK3 fluctuates and influences the output.

Therefore, in the case of the capacitive acceleration sensor using the SOI wafer, only parasitic capacitances formed between the surrounding portion 313 and the movable and fixed electrodes 304–307 may be controlled, and the potential of the surrounding portion 313 may be fixed like the above embodiments.

(Sixth embodiment)

Figures 13A, 13B, 13C:
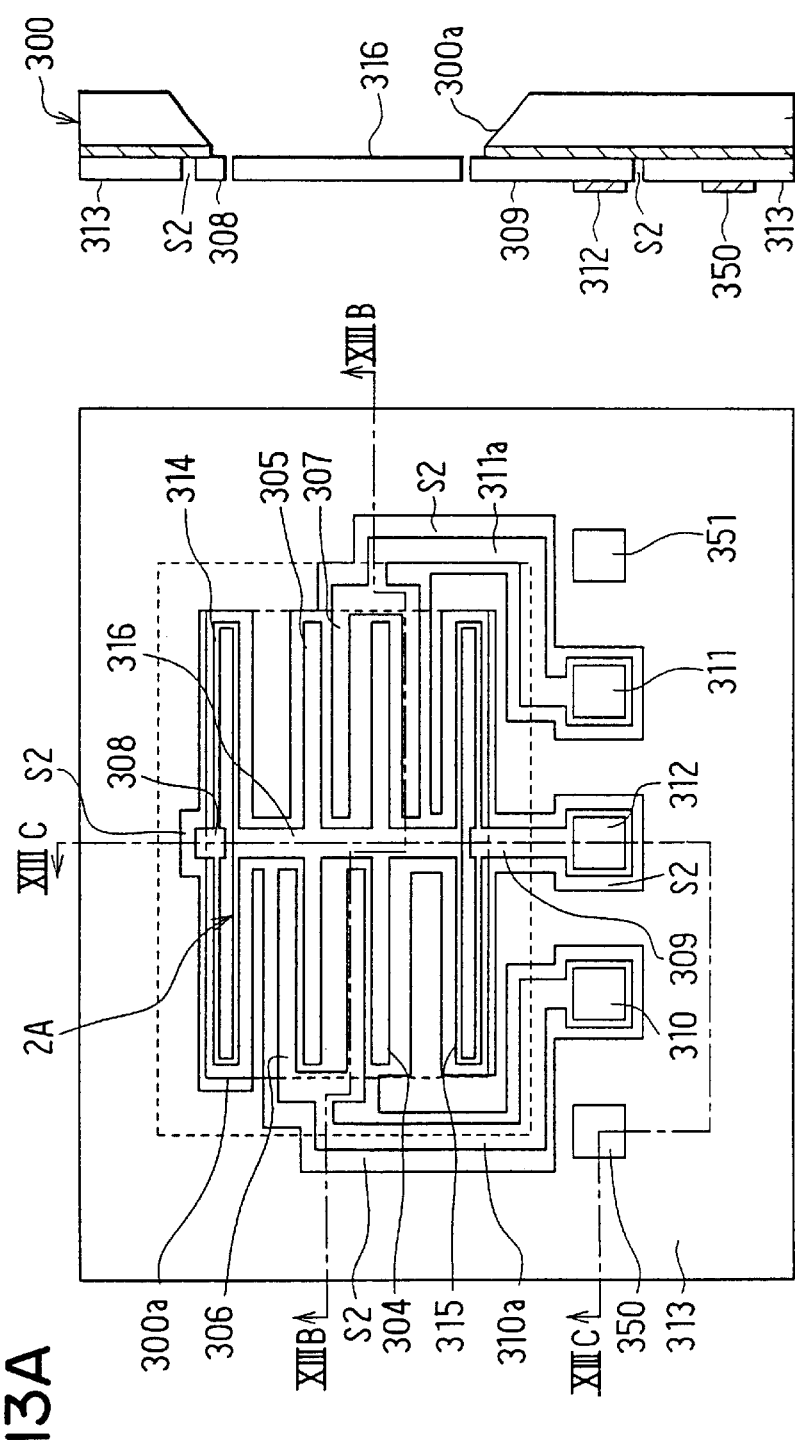
FIG. 13A is a plan view showing a semiconductor acceleration sensor according to a sixth preferred embodiment of the present invention.
FIG. 13B is a sectional view taken along line XIIIB—XIIIB in FIG. 13A.
FIG. 13C is a sectional view taken along line XIIIC—XIIIC in FIG. 13A.

This embodiment, shown in FIGS. 13A–13C, is a modified structure of the acceleration sensor J1.

As to this acceleration sensor shown in FIGS. 13A–13C, pads 350, 351 are formed on the surrounding portion 313. Here, these pads fix a potential of a surrounding portion 313 of a second silicon substrate 302 as the element forming film. The pads 350, 351 are made of an aluminum film or the like, in the same way as in the above embodiments.

By fixing the potential of the surrounding portion 313 by the pads 350, 351, parasitic capacitances CK1, CK2 and CK3 are fixed to a given potential to decrease an influence of a disturbance noise.

Here, the pads 350, 351 are provided with respect to each of two capacitive detecting portions, respectively. Out of two capacitive detecting portions, the fixed electrode 306 side is a first capacitive detecting portion, while the fixed electrode 307 side is a second capacitive detecting portion. The pad 350 decreases parasitic capacitances CK1 and CK3 formed between the surrounding portion 313 and the first capacitive detecting portion, while the pad 351 decreases parasitic capacitances CK2 and CK3 formed between the and surrounding portion 313 and the second capacitive detecting portion.

Since the pads as the surrounding portion potential fixing means is formed with respect to each of the capacitance detecting portions, certain potential can be applied to each of the capacitance detecting. Therefore, the electric charge in each parasitic capacitances can be controlled relative to each capacitance detecting portion. In other words, offsets formed in each capacitance detecting portion are controlled efficiently.

In this embodiment, the two capacitance detecting portions are formed to output capacitance changes substantially at the same level. Specifically, the beam-structure (for example; beam shape, the number of each electrodes and so on) is formed so that the magnitude of the capacitance change between capacitance C1' and C2' is substantially the same.

Further, distances between the first capacitance detecting portion (304, 306) and corresponding pad 350, and between the second capacitance detecting portion (305, 307) and corresponding pad 351 are substantially the same. Therefore, the same potential can be applied to the pads 350, 351, relative to the first and second capacitance detecting portions, respectively. That is, a voltage applied to the parasitic capacitance (CK1) with respect to the fixed electrode 1 and a voltage applied to the parasitic capacitance (CK2) with respect to the fixed electrode 2 can be equal. Therefore, control of this sensor can be facilitated.

Specifically, each of the pads 350, 351 are arranged symmetrically with respect to a symmetrical line (corresponds to center line XIIIC—XIIIC) which perpendicularly intersects a line connecting the first capacitance detecting portion and second capacitance detecting portion, as shown in FIG. 13A. When the pads 350, 351 are not arranged symmetrically, resistance R5, R6 in FIG. 14 differ from each other. Therefore, the voltages applied to the parasitic capacitances CK1, CK2 differ from each other, and the offset voltage will be influenced.

Further, as to the sensor element portion of this embodiment, fixed electrode pads 310, 311, for leading the capacitance change, are provided with respect to each capacitance detecting portion. Wires 310a, 311a as conductive portion, connecting each capacitance detecting portion and each pad 310, 311, are provided. Here, a resistance of the wire 310a is substantially the same as that of the wire 311a. A trench S2, arranged at a surrounding portion of the wires 310a, 311a, is formed so that a volume of the trench at the side of the wires 310 is substantially the same as that of the side of the wires 311, through adjustment of the trench width or depth.

Figure 14:
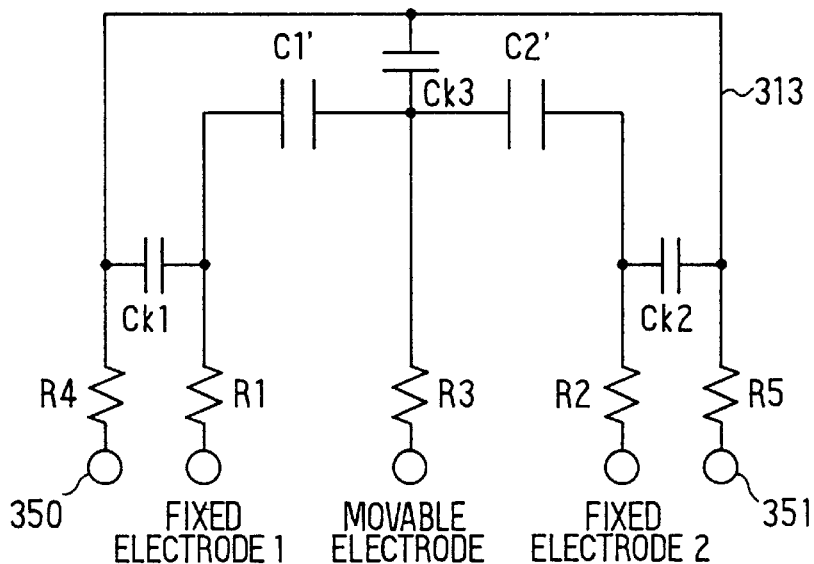
FIG. 14 is an equivalent circuit of the semiconductor acceleration sensor shown in FIG. 13A.

In this way, by adjusting the volume of the trench S2 surrounding each wires 310a and 311a, the parasitic capacitances CK1, CK2 shown in FIG. 14 are substantially equal, and a structure that prevents offset generation can be obtained. Further, since each pad 350, 351 can be applied with the same voltage, a control of this sensor can be facilitated.

(Seventh embodiment)

As to this acceleration sensor shown in FIGS. 15A–15C, one pad 352 as the surrounding portion potential fixing means is provided on a symmetrical line, which corresponds to center line XVC—XVC in FIG. 15A. By providing the pad 352 on the symmetrical line, the following advantages are obtained in comparison with the acceleration sensor in FIGS. 13A–13C.

The number of wire-bondings connected to a circuit chip is five relative to pads 310–312, 350 and 351 in the acceleration sensor in FIGS. 16A–16C, while the number of the wire-bondings is four relative to pads 310–312 and 352 in this seventh embodiment. Therefore, a total time of fabrication time can be shortened.

The pad 352 as the surrounding portion potential fixing means is provided at only one location. Therefore, the potential of the surrounding portion is stable. In the case of the acceleration sensor in FIGS. 13A–13C, two pads 350 and 351 are provided. Therefore, when a small potential difference occurs between two pads 350 and 351, a current flows between these pads, and the potential of the surrounding portion is fluctuated.

(Eighth embodiment)

As to this acceleration sensor shown in FIGS. 16A–16C, an insulating trench 360 is formed at a region where outer side of the pad 352 as the surrounding portion at surrounding portion 313 to insulate between an outer side of the insulating trench 360 and an inner side of the insulating trench 360.

In this way, the potential fixed to the surrounding portion 313 fixed by the pad 352 is not applied to the outer side of the insulating trench 360 at surrounding portion 313. Therefore, even if silicon dust or conductive material attaches to the outer side of the surrounding portion 313 or peripheral surface of the sensor, the fixed potential of the surrounding portion 313 does not fluctuate, because a leak current is not generated to the support substrate but generated to the outer side of the insulating trench 360.

This acceleration sensor is cut to a single chip units by a dicing cut after being formed on a wafer with plural chip units. As an advantage of the insulating trench 360 surrounding the sensor chip, this insulating trench 360 can be used for a mark for alignment of a blade when the wafer is cut to the single chip. Further, it can stop the chipping during the dicing cut.

This insulating trench 360 can obtain the same advantage as that of one trench when a plurality of trenches are formed. An insulating trench 360 comprising a plurality of trenches can be adapted to the acceleration sensor in the first to the seventh embodiments.

As to sixth, seventh and eighth embodiments, when the width of the first silicon substrate 301 shown in FIGS. 15B and 15C, specifically, frame widths Fl, F2, F3 and F4 of the sensor chip are identical, a distortion generated in the sensor chip caused by temperature change can be made uniformed, and temperature characteristics can be stabilized.

(Ninth embodiment)

Figure 17:
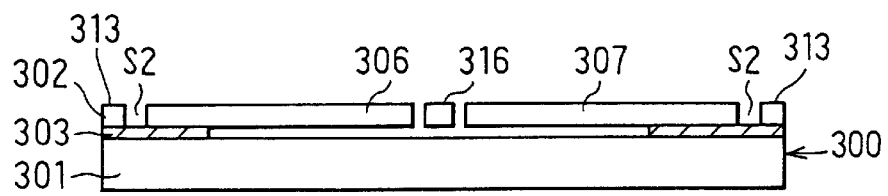
FIG. 17 is a sectional view showing a semiconductor acceleration sensor according to a ninth preferred embodiment of the present invention.

In this embodiment, as shown FIG. 17, a first silicon substrate 301 is provided as the support substrate under the movable portion. This structure also obtains the same advantages as the above embodiments.

As to the sixth, seventh, eighth and ninth embodiments, in the same ways as in the fourth embodiment, a voltage applied to the pads 350–352 as the surrounding portion potential fixing means is preferably the same as that of the movable electrode, so that the potential of the surrounding portion 313 is the same as that of the movable electrode.

Further, present invention can be adapted in not only a semiconductor acceleration sensor described the above but also in other semiconductor physical quantity sensors such as a semiconductor yaw rate sensor.

What is claimed is:

1. A semiconductor physical quantity sensor comprising:
   a substrate;
   a sensor element portion formed on the substrate and having a movable portion, for detecting a capacitance change in response to a movement of the movable portion;
   a surrounding portion provided at a surrounding region of the sensor element portion and insulated from the sensor element portion; and
   potential fixing portion electrically connected to the surrounding portion for fixing a potential of the surrounding portion, the potential of the surrounding portion being fixed to a constant potential independent of a potential of the movable portion of the sensor element.

2. A semiconductor physical quantity sensor comprising:
   a substrate unit having a first conductive film, an insulating film and a second conductive film, each of which is laminated on a semiconductor substrate;
   a beam-structure having a movable electrode, supported on a surface of the substrate unit by a first anchor, the first anchor being formed from the second conductive film;
   a fixed electrode facing the movable electrode, fixed to the surface of the substrate by a second anchor, the second anchor being formed from the second conductive film; and
   film potential fixing portion electrically connected to the first conductive film for fixing a potential of the first conductive film, the potential of the first conductive film being fixed to a predetermined potential independent of a potential of a movable portion of the second conductive film.

3. The semiconductor physical quantity sensor according to claim 2, further comprising:
   a first wire connected to the beam-structure and formed from the second conductive film; and
   a second wire connected to the fixed electrode, formed from the second conductive film and crossing the first wire at an intersection of the first wire,
   wherein one of the first and second wire has a bypass structure at the intersection by using the first conductive film.

4. The semiconductor physical quantity sensor according to claim 2, further comprising:
   a surrounding portion fixed to the second conductive film at a surrounding region of the beam-structure and the fixed electrode; and
   region potential fixing means for fixing a potential of the surrounding portion.

5. The semiconductor physical quantity sensor according to claim 4, further comprising:
   capacitance change outputting means, including the movable electrode, for outputting the capacitance change between the movable electrode and the fixed electrode via the movable electrode, wherein the region potential fixing means is connected to apply a potential to the surrounding portion which is equal to that of the movable electrode.

6. The semiconductor physical quantity sensor according to claim 2, further comprising:

capacitance change outputting means including the movable electrode, for outputting the capacitance change between the movable electrode and the fixed electrode via the movable electrode, wherein the film potential fixing portion is connected to apply a potential to the first conductive film which is equal to that of the movable electrode.

7. A semiconductor physical quantity sensor comprising:

a substrate unit having a first conductive film, an insulating film and a second conductive film, each being laminated on a semiconductor substrate;

a beam-structure having a movable electrode, supported by a surface of the substrate unit by a first anchor, the first anchor being formed from the second conductive film;

a fixed electrode facing the movable electrode, fixed to the surface of the substrate by a second anchor, the second anchor being formed from the second conductive film and electrically separated from the first anchor; and a potential outputting portion fixed to the surface of the substrate by a third anchor, the third anchor being formed from the second conductive film and electrically separated from the first anchor and the second anchor, wherein the first conductive film is electrically connected to the potential outputting portion via the third anchor, a potential of the potential outputting portion is controlled to a predetermined potential independent of a potential of the movable electrode of the beam-structure.

8. A semiconductor physical quantity sensor comprising:

a substrate having a support substrate and an element forming film formed on the support substrate;

a sensor element portion formed on the substrate, having a movable portion, for detecting a capacitance change in response to a movement of the movable portion;

a surrounding portion provided at a surrounding region of the sensor element portion, divided from the sensor element portion by a trench formed in the element forming film; and region potential fixing portion electrically connected to the surrounding portion for fixing a potential of the surrounding portion, the potential of the surrounding portion being fixed to a constant potential independent of a potential of the sensor element portion.

9. The semiconductor physical quantity sensor according to claim 8, wherein:

the sensor element portion includes a plurality of capacitance detecting portions, and the region potential fixing portion is provided with respect to each of the capacitance detecting portions.

10. The semiconductor physical quantity sensor according to claim 9, wherein:

the sensor includes a first and a second capacitance detecting portions for detecting capacitance change of substantially the same level each other, a distance between the first capacitance detecting portion and one portion of the region potential fixing portion is substantially the same as that between the second capacitance detecting portion and another portion of the region potential fixing portion.

11. The semiconductor physical quantity sensor according to claim 10, wherein the one portion of the region potential fixing portion and the another portion of the region potential fixing portion are arranged symmetrically with respect to a symmetrical line which perpendicularly intersects a line connecting the first and second capacitance detecting portions.

12. The semiconductor physical quantity sensor according to claim 9, wherein the sensor element portion comprises:

pads provided with respect to each capacitance detecting portion to lead a capacitance change;

conductive portions electrically connected to each pad and each capacitance detecting portion, respectively;

wherein resistance of each of the conductive portions is substantially the same, and volume of the trench surrounding each of the conductive portions are substantially the same.

13. The semiconductor physical quantity sensor according to claim 8, wherein:

the sensor includes first and second capacitance detecting portions for detecting capacitance change of substantially the same level each other, the region potential fixing portion being arranged on a symmetrical line which perpendicularly intersects a line connecting the first capacitance detecting portion and second capacitance detecting portion.

14. The semiconductor physical quantity sensor according to claim 9, wherein each of the capacitance detecting portions comprises a movable electrode provided to the movable portion;

a fixed electrode supported by the support substrate to face the movable electrode;

a capacitance change outputting means connected to the movable electrode for outputting the capacitance change between the movable electrode and the fixed electrode via the movable electrode, wherein the region potential fixing portion applies a potential equal to that of the movable electrode.

15. The semiconductor physical quantity sensor according to claim 8, wherein an insulating trench is formed at a region where an outer side of the region potential fixing portion located at the surrounding portion to insulate between an outer side of the insulating trench and an inner side of the insulating trench.

16. The semiconductor physical quantity sensor according to claim 8, wherein:

the sensor element portion includes:

a beam portion; and a fixed portion that detects a capacitance change with the movable portion, and is divided from the surrounding portion by the trench, wherein a part of the surrounding portion is extended to a portion between the beam portion and the fixed portion.

* * * * *